United States Patent
Okumura et al.

(10) Patent No.: US 6,178,424 B1
(45) Date of Patent: Jan. 23, 2001

(54) INFORMATION DISTRIBUTING SYSTEM AND STORAGE MEDIUM RECORDED WITH A PROGRAM FOR DISTRIBUTING INFORMATION

(75) Inventors: Akitoshi Okumura; Takahiro Ikeda, both of Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/078,681

(22) Filed: May 14, 1998

(30) Foreign Application Priority Data

May 14, 1997 (JP) ..................................... 9-139359

(51) Int. Cl.[7] ...................................................... G06F 17/30
(52) U.S. Cl. ................... 707/10; 707/4; 707/102; 709/201
(58) Field of Search ................ 707/103, 10, 513, 707/102, 4; 709/201

(56) References Cited

U.S. PATENT DOCUMENTS 5,530,852 * 6/1996 Meske, Jr. et al. ................. 395/600
5,761,662 * 6/1998 Dasan ..................................... 707/10
5,907,837 * 6/1998 Ferrel et al. ............................. 707/3
5,953,732 * 9/1999 Meske, Jr. et al. ................... 707/513

* cited by examiner

Primary Examiner—John Breene
Assistant Examiner—Cheryl Lewis
(74) Attorney, Agent, or Firm—Foley & Lardner (57) ABSTRACT

An information activity management unit records an item characterizing information and an item of a user thereof per information collected. A user attribute information storage unit records a user attribute characterizing each user. When an information collecting unit fetches the information from a database system, a similar information user common attribute extracting unit obtains a user of information similar to the above information and obtains a user attribute common to the users from the user attribute information storage unit. An information distributing unit obtains all the users having this common user attribute from the user attribute information storage unit and distribute the collected information to these users. An activity state registering unit, when notified from the user of an effect that the distributed information is useful, registers the information activity management unit with this user as a user of the distributed information.

11 Claims, 6 Drawing Sheets

FIG.1

| INFORMATION ID | | NEWS 1 | NEWS 2 |
|---|---|---|---|
| INFORMATION ATTRIBUTE | TEXT | BANK C WAS MERGED WITH OVER BY BANK B | COMPANY T DEVELOPED HIGH RESPENDING SPEED AND WIDE VISUAL FIELD LCD UTILIZING ANTIFERROELECTRIC LIQUID CRYSTAL |
| | KEYWORD | BANK C WAS MERGED WITH BY BANK B | COMPANY T ANTIFERROELECTRIC LIQUID CRYSTAL,RESPONDING SPEED,WIDE VISUAL FIELD, LCD,DEVELOPED |
| | PROVIDER | A NEWSPAPER A | ELECTRICITY NEWSPAPER |
| | PROVIDING LOCATION | ECONOMIC COLUMN | PRODUCT COLUMN |
| | PROVIDING TIME | OCT.12,1997 | MAR.12,1997 |
| | RECEIVER | X,Y | A,B,V,W |
| | USER | X,Y | V,W |
| | USING PURPOSE | MAKING REPORT | UNKNOWN |

FIG.2

| FUNDAMENTAL WORK INFORMATION | WORK IN-CHARGE INFORMATION | INDIVIDUAL INFORMATION | INFORMATION ACTIVITY HYSTERESIS |
|---|---|---|---|
| • NAME<br>• BELONGING SECTION<br>• JOB CLASSIFICATION<br>• BELONGING ACADEMIC ASSOCIATION<br>• RELATED PATENT CLASSIFICATION<br>• RELATED TECHNICAL CODE<br>• DIRECT SUPERVISOR | • TRANSACTION ENTERPRISE<br>• CONCERN ENTERPRISE<br>• DISTRICT IN CHARGE<br>• WORK IN CHARGE PROGRAMMING HISTORY<br>• PERTICIPATING PROJECT | • NUMBER OF SERVICE YEARS<br>• TASTE<br>• CERTIFICATION<br>• HEALTH CONDITION<br>• SERVICE PLACE<br>• ADDRESS<br>• FAMILY MEMBER | • REFERENCE URL<br>• REFERENCE DATABASE<br>• RETRIEVAL KEY<br>• ACTIVITY SYSTEM<br>• REFERENCE NEWSGROUP<br>• SUBSCRIBED NEWSPAPER AND MAGAZINE<br>• PARTICIPATING MAILING LIST |

| NAME | V | W | X | Y | Z |
|---|---|---|---|---|---|
| BELONGING SECTION | SECTION 1 | SECTION 2 | SECTION 3 | SECTION 4 | SECTION 5 |
| WORK IN CHARGE | SALES FOR SEMICONDUCTOR | SALES FOR SEMICONDUCTOR | SALES FOR SEMICONDUCTOR | SE | SE |
| PARTICIPATING PROJECT | FINANCIAL DEREGULATION | | FINANCIAL DEREGULATION | FINANCIAL DEREGULATION | |
| TRANSACTION ENTERPRISE | COMPANY P | COMPANY Q | COMPANY R | | |

FIG.5

| INFORMATION ID | NEWS 1 | NEWS 2 | NEWS 3 |
|---|---|---|---|
| TEXT | C BANK WAS TAKEN OVER BY B BANK | T COMPANY DEVELOPED HIGH RESPONDING SPEED AND WIDE VISUAL FIELD LCD UTILIZING ANTIFERROELECTRIC LIQUID CRYSTAL | H COMPANY DEVELOPED STN SYSTEM LCD, CAPABLE OF DISPLAYING MOTION PICTURE AT 5.5-FOLD RESPONDING SPEED |
| KEYWORD | B BANK, C BANK, TAKE OVER | T COMPANY, ANTIFEROELECTRIC LIQUID CRYSTAL, RESPONDING SPEED, WIDE VISUAL FIELD, LCD, DEVELOPMENT | H COMPANY, RESPONDING SPEED, 5.5-FOLD, DISPLAYING MOTION PICTURE, STN SYSTEM, LCD, DEVELOPMENT |
| PROVIDER | A NEWSPAPER | ELECTRICITY NEWSPAPER | ELECTRICITY NEWSPAPER |
| PROVIDING LOCATION | ECONOMY COLUMN | PRODUCT COLUMN | PRODUCT COLUMN |
| PROVIDING TIME | OCT.12,1997 | MAR.12,1997 | MAR.1,1997 |
| RECEIVER | X,Y | A,B,V,W | NOT INDICATED |
| USER | X,Y | V,W | NOT INDICATED |
| USING PURPOSE | MAKING REPORT | UNKUOWN | NOT INDICATED |
| INFORMATION ATTRIBUTE | | | |

FIG.6

INFORMATION DISTRIBUTING SYSTEM AND STORAGE MEDIUM RECORDED WITH A PROGRAM FOR DISTRIBUTING INFORMATION

BACKGROUND OF THE INVENTION

1. Field of the Invention

The invention relates to an information distributing system, connected to a variety of database systems, for distributing information fetched out of database thereof to users.

2. Description of the Related Art

This type of information distributing system has hitherto been constructed to automatically fetch, if a user writes to his or her own profile a condition for fetching the information the user himself or herself requires, updated information out of the variety of databases and distribute only the information accordant with the profile to the user concerned. In the information distributing system in a simple form, the profile involves the use of a condition based on a combination of keywords, and only the information meeting with this condition is to be distributed. Accordingly, if the condition set by the user is improper, the user can not necessarily obtain the information desired by the user himself or herself.

Japanese Patent Application Laid-Open Publication No. Hei 4-65743 discloses an information selective receiving system as the same type of system. This system is contrived so that a condition of the information to be received is set in a text filter, and only the information meeting with this condition is transferred to a receiving unit. Similarly, in an article/advertisement distributing apparatus disclosed in Japanese Patent Application laid-Open Publication No. Hei 5-143653, only the information containing a keyword stored in an individual keyword memory device is distributed. Further, Japanese Patent Application Laid-Open Publication No. Hei 9-16677 discloses an apparatus for retrieving the database, wherein know-how of other person serves as a keyword.

On the other hand, there can be considered several forms such as automatically extending the profile in accordance with a content in which the user has an interest, and distributing the information accordant with the thus extended profile. To start with, a plurality of texts written by the user are used as a profile, the keywords contained in these texts are compared with keywords in newly fetched texts, and only the texts sufficiently accordant therewith are distributed. In this form, the content of the profile is more enriched as a quantity of the texts created by the user increases, and can be, it follows, used as a more detailed condition. What can be considered as another form is that the user evaluates the texts distributed and modifies the condition of the profile in accordance with a result of the evaluation. In this form, the condition of the profile is getting approximate to a content intended by the user, thereby gradually coming to such a state that only the information according to the intention of the user is distributed. Still another thinkable form is that the user utilizes the keywords set in the profile by developing them into synonyms etc. In this form, even if the keywords definitely designated by the user are not contained therein, the texts are to be distributed, if words having implications close thereto are contained.

A problem inherent in the prior art is that the information required by the user is not distributed unless clearly described in the keywords and the profile. The reason for this is that the system distributes the texts to the user on the basis of only the keywords and the condition of the profile. Therefore, the user must update the keywords and the profile so as to clearly express his or her own request at all times. However, much knowledge is required for properly setting them, which might be difficult for the ordinary users to do so. Further, there is such a problem that the detail setting is time-consuming.

An object of the present invention is therefore to provide an information distributing system for distributing the information on the basis of an activity hysteresis of the information distributed in the past.

SUMMARY OF THE INVENTION

To accomplish the above object of the present invention, according to an aspect of the invention, there is provided an information distributing system comprises: an information collecting unit for periodically fetching information out of a database system, an information activity management unit for recording some predetermined information attributes containing an item characterizing the information and an item of a user of the information per information collected, a user attribute information storage unit for recording some user attributes characterizing the user per user, a similar information user common attribute extracting unit for retrieving from the information activity management unit the information exhibiting a characteristic similar to the characteristic of the information collected by the information collecting unit, and, when a plurality of users are recorded in the information activity management unit, obtaining a user attribute common to all the users with reference to the user attribute information storage unit, an information distributing unit for obtaining all the users having the common user attribute obtained by the similar information user common attribute extracting unit with reference to the user attribute information storage unit, and distributing the collected information to these users, and an activity state registering unit for registering, when notified, from the users to whom the information is distributed, of an effect that the information is useful, these users in an item of user of the distributed information in the information activity management unit.

Herein, an item characterizing the information in the information activity management unit includes an item of keyword contained in the information, an item of provider of the information and an item of providing location of the information. The similar information user common attribute extracting unit specifies most similar information by examining a degree of similarity in terms of the keyword contained in the information collected by the information collecting unit, the provider of the information, the providing location of the information, the item of keyword per information recorded in the information activity management unit, the item of provider of the information and the item of the providing location of the information.

The users utilizing a series of pieces of information similar to each other in terms of information characteristics such as keywords contained in the information, an information provider (e.g., a name of newspaper company when the information is news), and an information providing location (e.g., an economy column and a product column when the information is news on the newspaper), have a large number of common points in user attributes (e.g., a job classification, a work in charge and a taste). Accordingly, if there is a fact that users X, Y, Z have already effectively utilized a certain piece of information A, information B similar to the information A has not only a possibility in which the users might utilize the information B but also a possibility in which other users R, S having a user attribute common to the users X, Y, Z might effectively utilize the information B even if there is no fact that those users have ever effectively utilized the information A.

The present invention was contrived in view of such a point, the information activity management unit records some predetermined information attributes containing an item characterizing the information and an item of users of the information per information collected, and the user attribute storage unit records some user attributes characterizing the users per user. When the information collecting unit periodically fetches the information out of a database system, the similar information user common attribute extracting unit retrieves from the information activity management unit the information exhibiting the characteristics similar to the characteristics of the information collected, and, when there exists such information and there are a plurality of such users, obtains the user attribute common to all the users with reference to the user attribute storage unit. Subsequently, the information distributing unit obtains all the users having the common user attribute obtained by the similar information user common attribute extracting unit with reference to the user attribute storage unit, and distributes the collected information to those users. Then, the activity state registering unit, when notified of an effect the information is useful from the user to whom the information is distributed, registers this user in the item of user of the distributed information in the information activity management unit.

Note that a method of determining the distributing target users when there exists no information having the characteristics similar to the characteristics of the collected information, and when there are not the plurality of such users even if the above information exists, may involve the use of a profile of each user as in the prior art. In this case, it is preferable to use a plurality of profiles written by the user as a profile of enriching the content of the profile in accordance with creation of the text issued. Even in this case, the information is distributed not only the users fitted to the profile but also all the users having the common user attribute. Namely, the similar information user common attribute extracting unit, when there exists no information exhibiting the characteristics similar to the characteristics of the information collected by the information collecting unit, and when there are not, if such information exists, the plurality of users thereof, extracts the user issuing the text including the keyword contained in the information collected by the information collecting unit by examining the issued text of each user stored in the user profile storage unit. When the plurality of such users exist, the extracting unit obtains the user attribute common to all the users with reference to the user attribute information storage unit, and notifies the information distributing unit of this common user attribute. The information distributing unit obtains all the users having this common user attribute with reference to the user attribute information storage unit, and distributes the collected information to those users.

When there exists no information having the characteristics similar to the characteristics of the collected information, and when there are not, even if such information exists, the plurality of users, and further when there are not the plurality of users fitted to the profile, there may be adopted an arbitrary method of dealing with these cases such as a method of distributing no information and a method of distributing the information to all the users because of such information being considered rare.

According to another aspect of the present invention, the information distributing unit is constructed to add to the collected information a distribution reason (purporting that, for instance, the information similar to the information distributed this time is utilized by a certain different user whose work in charge is the same as that of the user concerned, and so forth) containing the common user attribute obtained by the similar information user common attribute extracting unit, and thus distribute the information to the user. The suer is thereby able to recognize which field the distributed information corresponds to, and a labor for rearranging the distributed information can be reduced.

According to still another aspect of the present invention, the information distributing system further comprises a distribution unnecessary condition storage unit for storing a distribution unnecessary condition per user. The activity state registering unit is constructed to register, when notified from the user to whom the information is distributed of an effect that the information is unnecessary, the distribution unnecessary condition storage unit with the distribution unnecessary condition based on the distribution reason of this time as a distribution unnecessary condition relative to this user. The information distributing unit is constructed to exclude, from distributing target users, even the user having the common user attribute obtained by the similar information user common attribute extracting unit if the distribution reason of this time meets with the distribution unnecessary condition relative to the relevant user stored in the distribution unnecessary condition storage unit. With this construction, the user, if the information distributed for a certain distribution reason is unnecessary for the user himself or herself, gives a notification of this effect, thereby making it possible to avoid a futile distribution implemented for the same distribution reason.

By contrast, in order to distribute the information, if a certain condition is established, to even the users having no common user attribute obtained by the similar information user common attribute extracting unit, the information distributing system further comprises a distribution necessary condition storage unit for storing a distribution necessary condition per user. The information distributing unit is constructed to include, into distributing target users, even the user having no common user attribute obtained by the similar information user common attribute extracting unit if the distribution reason of this time meets with the distribution necessary condition relative to the relevant user stored in the distribution necessary condition storage unit.

According to a further aspect of the present invention, the information distributing unit is constructed to determine, as far as the common user attribute obtained by the similar information user common attribute extracting unit meets with a predetermined distribution condition, a distributing target user corresponding to this common user attribute. Further, the information distributing unit is constructed to distribute the information in such a way as to re-express and summarize a content of the collected information, depending on the user attribute stored in the user attribute information storage unit.

BRIEF DESCRIPTION OF THE DRAWINGS

Other features and advantages will become apparent from the following description when taken in conjunction with the accompanying drawings, in which.

DETAILED DESCRIPTION OF THE PREFERRED EMBODIMENTS

Embodiments of the present invention will hereinafter be described in detail with reference to the accompanying drawings.

Figure 1:
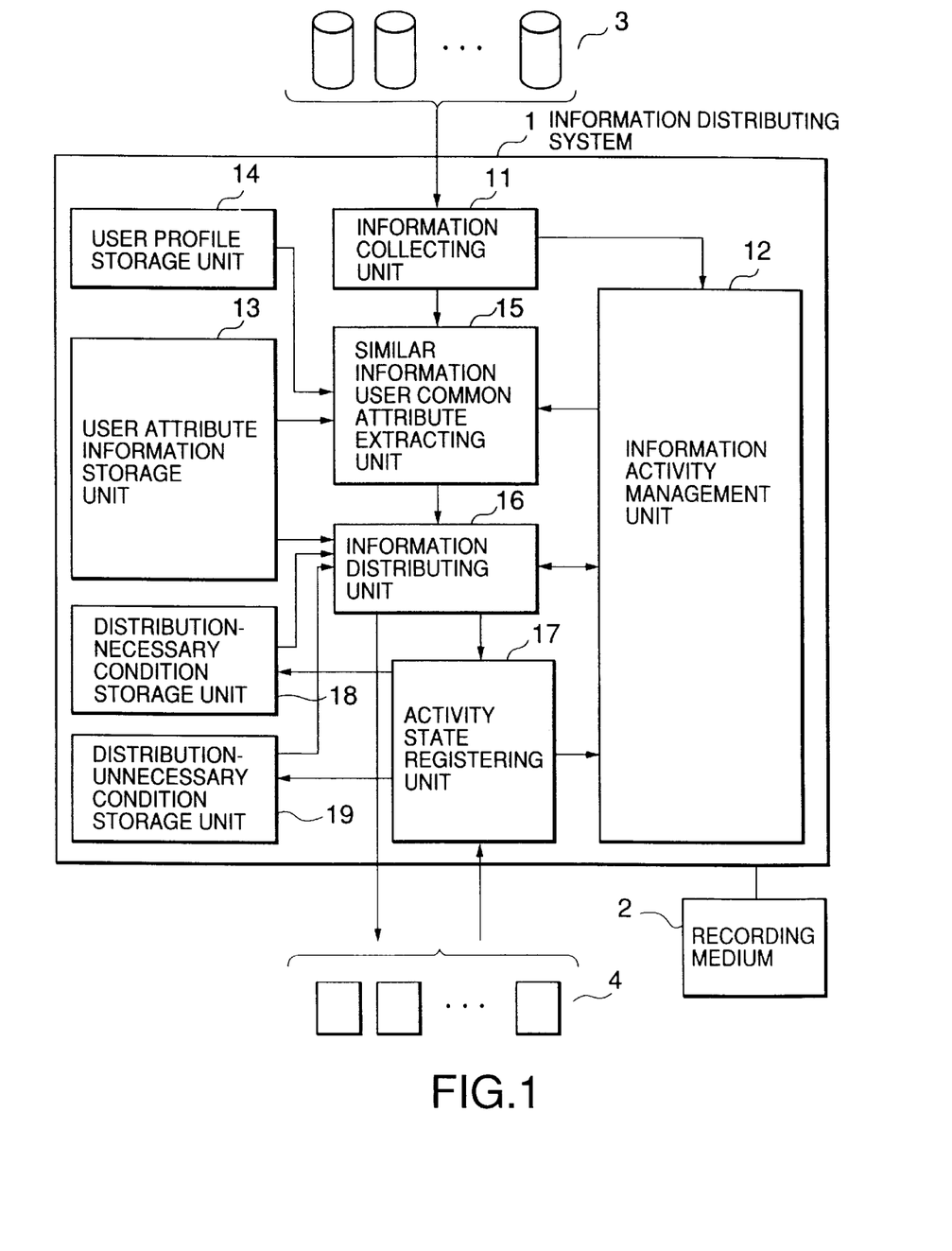
FIG. 1 is a block diagram illustrating an information distributing system in an embodiment of the present invention.

Referring first to FIG. 1, an information distributing system 1 in one embodiment of the present invention is constructed of an information collecting unit 11, an information activity management unit 12, a user attribute information storage unit 13, a user profile storage unit 14, similar information user common attribute extracting unit 15, an information distributing unit 16, an activity state registering unit 17, a distribution necessary condition storage unit 18 and a distribution unnecessary condition storage unit 19. The information distributing system 1 is connected to a variety of database systems 3 and each user 4 to whom the information is distributed. The thus constructed information distributing system 1 can be actualized by a CPU such as, e.g., a microprocessor, a memory, a computer incorporating a communication function for collecting and distributing the information, and a recording medium 2 shown in FIG. 1. The recording medium 2 may be a magnetic disk, a semiconductor memory and other recording media. The recording medium 2 is recorded with a program for controlling the distribution of information. This information distribution control program read in by the computer controls an operation of the computer and makes the computer function as each of components constituting the information distributing system 1 shown in FIG. 1.

Within the information distributing system 1, the information collecting unit 11 is connected to the variety of database systems 3 and periodically fetches information such as news etc out of the database systems. The information collecting unit 11 has a function of extracting characteristics of the fetched information and also a function of registering the information having these characteristics in the activity management unit 12. The characteristics extracted therefrom are a keyword contained in that item of information, a provider and a providing location of the information, etc. The keyword is extracted by a built-in keyword extracting unit (unillustrated), which involves a natural language processing technique for analyzing a text of the fetched information. Note that the database system 3 connected thereto may be exemplified by a commercial database service, a personal computer communication service and World Wide Web (WWW) etc.

Figure 2:
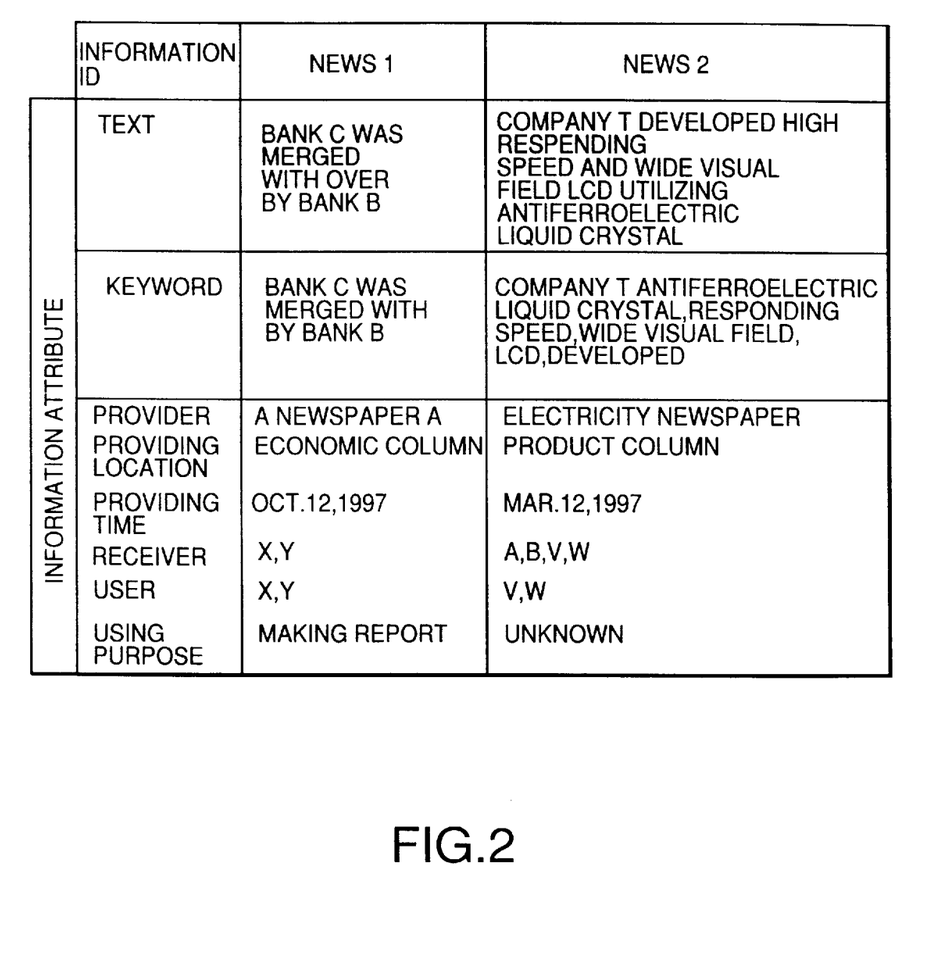
FIG. 2 is a chart showing an example of a recording content of an information activity management unit.

The information activity management unit 12 records, per piece of information collected, some predetermined information attributes containing an item for characterizing the information and an item of the information user. FIG. 2 shows an example of a record content in the information activity management unit 12. In this example, each piece of collected information, to which an information ID is allocated, is recorded with information attributes such as a "text", a "keyword", a "provider", a "providing location", a "providing time", a "receiver", a "user" and an "using purpose".

Herein, the items characterizing the information given above are, in the case of the present embodiment, the "keyword", the "provider", and the "providing location". The "text" may be used instead of the "keyword". The "text" corresponds to a text of the collected information, and the "keyword" is a principal term contained in this text. The "provider" and the "providing location" are a provider and a providing location of the information concerned, and an "electricity newspaper" and a "product column" are given in the chart.

Further, an item of the user of the above information is the "user" in the case of this embodiment.

The information collecting unit 11 registers the "information ID", the "text", the "keyword", the "provider", the "providing location" and the "providing time". The "receiver" corresponds to a part to which the information distributing unit 16 distributes the information concerned, and is registered by the information distributing unit 16. The "user" indicates a user who could effectively utilize the same information among the users having received the information distributed, and the "using purpose" indicates what purpose the information is utilized for. These items are registered by the activity state registering unit 17 on the basis of feedback information given from the user to whom the information has been distributed.

Figure 3:
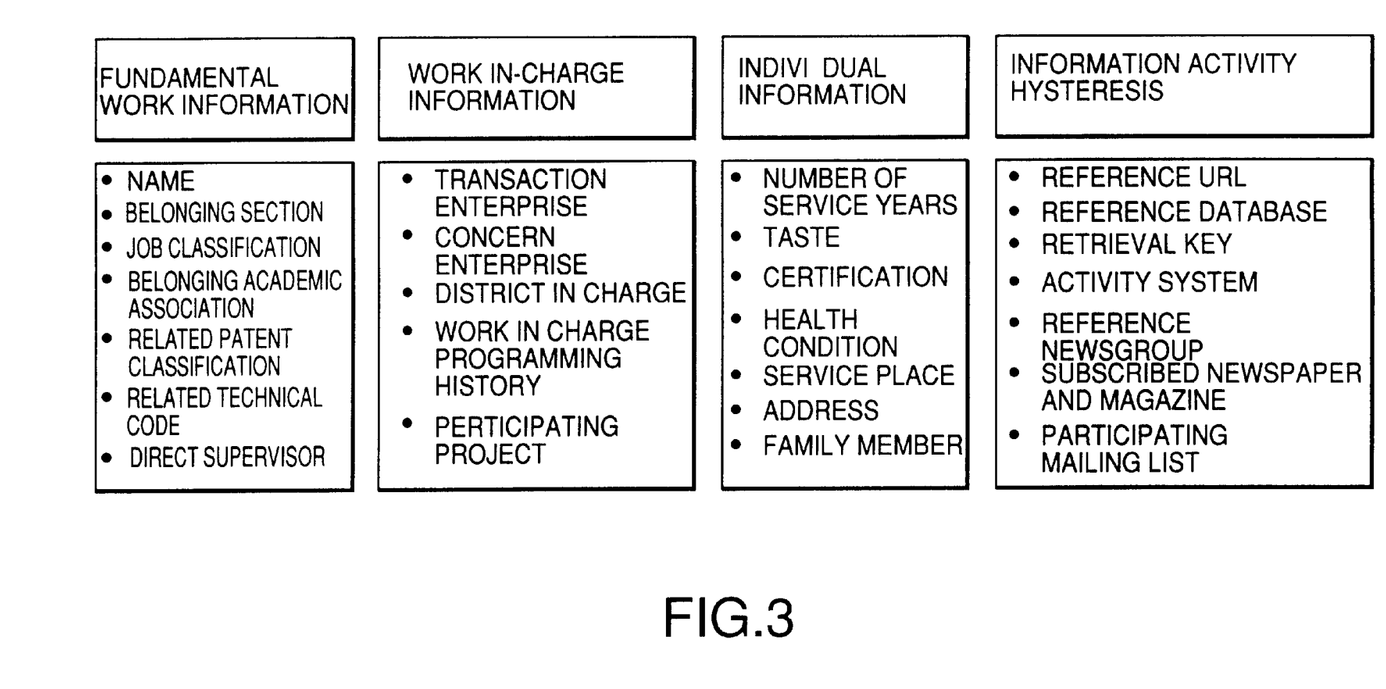
FIG. 3 is a chart showing an example of user attributes.

Referring again to FIG. 1, the user attribute information storage unit 13 records some user attributes characterizing the user per user to whom the information is distributed. FIG. 3 shows an example of the user attributes. Referring to FIG. 3, the user attributes are classified into four categories such as fundamental work information; work-in-charge information, individual information and an information activity hysteresis. The fundamental work information is exemplified by a name, a belonging section, a job classification, a belonging academic association, a related patent classification, a related technical code and a direct supervisor. The work-in-charge information is exemplified by a transaction enterprise, an enterprise of concern, a district in charge, a work in charge, a programming history and a participation project. The individual information is exemplified by the number of service years, a taste, a certification, a health condition, a working place, an address and members of family. The information activity hysteresis is exemplified by a reference URL, a reference database, a retrieval key, an activity system, a reference news group, subscription newspaper and magazine and a participation mailing list. The user attribute information storage unit 13 is previously registered with values per individual user with respect to an arbitrary plurality of items or all the items of those user attributes.

Referring again to FIG. 1, the user profile storage unit 14 is stored with the texts issued up to the present time by the user per user to whom the information is distributed.

The similar information user common attribute extracting unit 15 executes a process of retrieving from the information activity management unit 12 the information exhibiting characteristics similar to the characteristics of the information collected by the information collecting unit 11, a process of obtaining the user attributes common to all the users with reference to the user attribute information storage unit 13 if there are, when the retrieval is successful, a plurality of users of the above information, and a process of extracting, when failing to retrieve it or there are not, even if successful, the plurality of users, the user issuing the text including the keyword contained in the information collected by the information collecting unit 11 by examining the text issued by the user stored in the user profile storage unit 14, and obtaining, when there are plurality of such users, the user attributes common to all the users with reference to the user attribute information storage unit 13. The information distributing unit 16 is informed of the thus obtained common user attributes as pieces of information for determining a destination of the distribution.

The distribution necessary condition storage unit 18 is, if there is a condition under which the distribution is needed per user, stored with this condition. The distribution unnecessary condition storage unit 19 is, if there is a condition under which the distribution is not needed per user, stored with this condition.

The information distributing unit 16 obtains all the users having the common user attributes obtained by the similar information user common attribute extracting unit 15 with reference to the user attribute information storage unit 13, and distributes the information collected this time by the information collecting unit 11 to those users. In accordance with this embodiment, however, because of the distribution necessary condition storage unit 18 and the distribution unnecessary condition storage unit 19 being provided therein, if a reason for the distribution of this time meets with the distribution unnecessary condition relative to the relevant user that is stored in the distribution unnecessary condition storage unit 19, there must be executed such control as to exclude even the user having the common user attributes obtained by the similar information user common attribute extracting unit 15 out of the distributing target users. Then, if the reason for the distribution of this time meets with the distribution necessary condition relative to the user stored in the distribution necessary storage unit 18, there must be executed such control as to include even the user having no common user attributes obtained by the similar information user common attribute extracting unit 15 in the distributing target users. Note that the present invention may include an embodiment constructed to include any one of the distribution necessary condition storage unit 18 and the distribution unnecessary condition storage unit 19 or to include neither the unit 18 nor the unit 19.

Further, in this embodiment, the information distributing unit 16 has a construction for distributing the information to the user with the distributing reason containing the common user attributes obtained by the similar information user common attribute extracting unit 15.

The activity state registering unit 17 is, when notified of the purport that the information given from the user 4 to whom the information is distributed is useful, registered with a name of the user 4 as a "user" in the distributed information in the information activity management unit 12. At this time, when notified of the using purpose together, the registering unit 17 is also registered with the "using purpose" as well. Further, in this embodiment, the activity state registering unit 17 incorporates the function of, when notified of the purport that the information given from the user to whom the information is distributed is unnecessary, registering the distribution unnecessary condition storage unit 19 with the distribution unnecessary condition based on the distribution reason of this time as a distribution unnecessary condition relative to the user concerned. The activity state condition registering unit 17 further incorporates the function of, when requested by an arbitrary user to register the distribution necessary condition, registering the distribution necessary condition storage unit 18 with this request.

Figure 4:
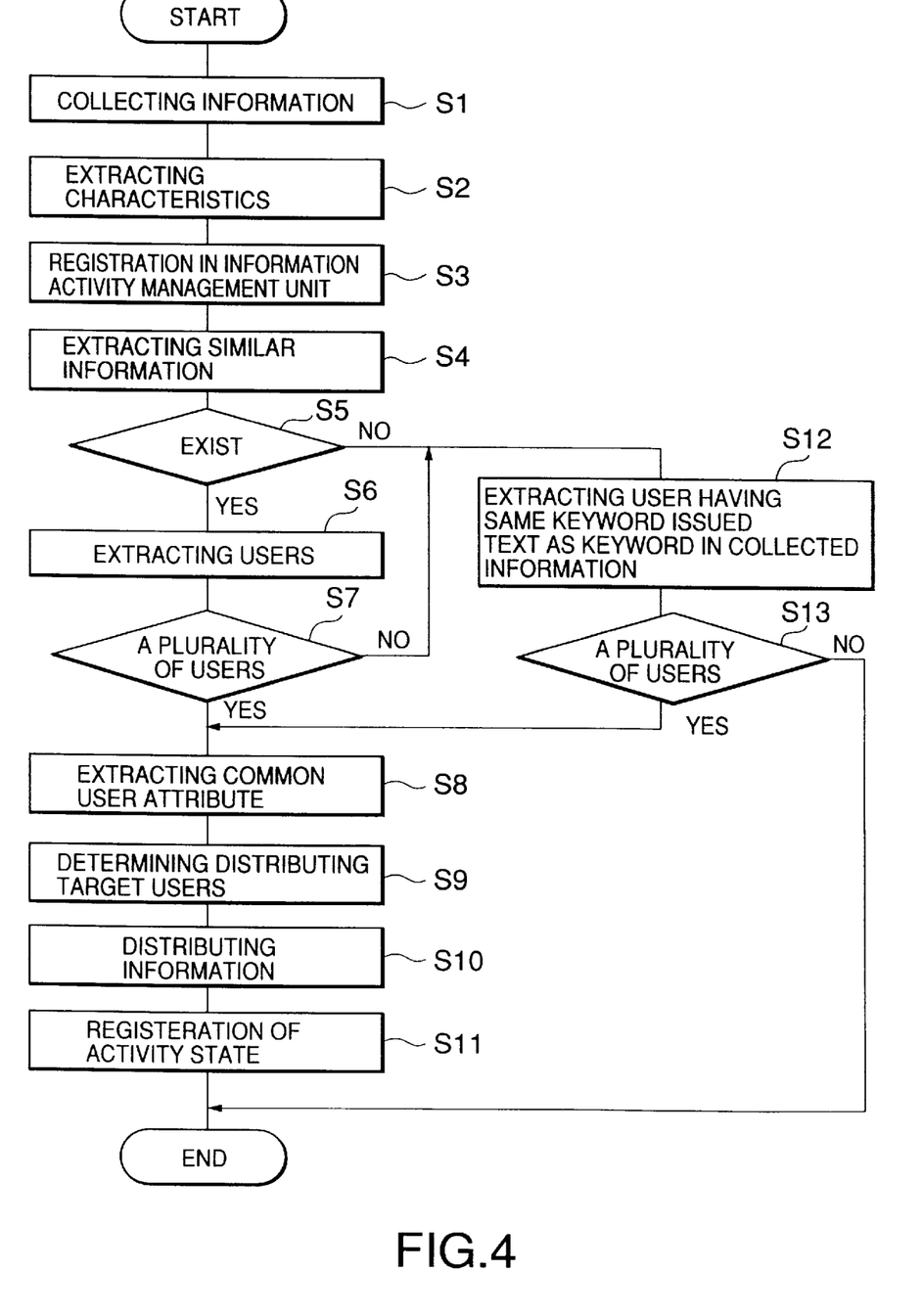
FIG. 4 is a flowchart showing a processing example of the information distributing system.

FIG. 4 is a flowchart showing an example of processes in the information distributing system 1 in FIG. 1, which are executed for each of a series of information periodically collected. Herein, the information collecting unit 11 executes the processes in steps S1–S3, the similar information user common attribute extracting unit 15 implements the processes in steps S4–S8, S12 and S13, the information distributing unit 16 executes the processes in steps S9 and S10, and the activity state registering unit 17 carries out the process in step S11, respectively. The operation in this embodiment will hereinafter be explained along a flow of processing in this flowchart.

The information collecting unit 11 periodically accesses the database system 3 and thus fetches a new piece of information (S1). Next, the information collecting unit 11 analyzes the fetched information, then extracts a keyword contained in a text thereof, and obtains a provider, a providing location and a providing time (S2). Subsequently, the information collecting unit 11 takes a unique information ID, then registers in the information activity management unit 12 the text, the keyword, the provider, the providing location and the providing time of the information, and notifies the similar information user common attribute extracting unit 15 of this information ID (S3).

The similar information user common attribute extracting unit 15 refers to the characteristics (the keyword, the provider and the providing location in this embodiment) of the information collected this time from within the information activity management unit 12 in accordance with the notified information ID, and thus extracts from the information activity management unit 12 other information exhibiting characteristics most similar to the above characteristics (S4). This process is done by, e.g., marking a degree of similarity of the characteristics of other information to those of the information collected this time and obtaining data about a maximum point in the information having a higher degree of similarity than a predetermined fiducial point. The marking involves the use of a method of imparting a mark corresponding to, e.g., the number of coincidences of the keyword as well as imparting marks to coincidences and non-coincidences of the providing location and the providing time, thereby obtaining a total sum of marks. Incidentally, if there is no information having the higher degree of similarity than the predetermined fiducial point, the information is dealt with on the assumption that there exists no information similar to the information collected this time.

The similar information user common attribute extracting unit 15, if there is not information exhibiting the higher degree of similarity than the predetermined fiducial point, proceeds to step S12, and, if there exists the information having the higher degree of similarity than the predetermined fiducial point, proceeds to step S6 (S5).

In step S6, the similar information user common attribute extracting unit 15 extracts from the information activity management unit 12 the user of other information exhibiting the characteristics most similar to the characteristics of the information collected this time. Then, if there are a plurality of users, the extracting unit 15 proceeds to step S8 and, whereas if there are not the plurality of users, proceeds to step S12 (S7).

In step S8, the similar information user common attribute extracting unit 15 fetches, from the user attribute information storage unit 13, the user attribute of each of the plurality of users, and extracts the user attribute (a common user attribute) having the same value among the plurality of users. Then, the similar information user common attribute extracting unit 15 notifies the information distributing unit 16 of this common user attribute together with the information ID of the information collected this time. Note that if there exists no single common user attribute, the information distributing unit 16 is notified of this effect.

While on the other hand, when processing to step S12 because of there being not the plurality of users irrespective of whether there is no other information similar to the information collected this time, the similar information user common attribute extracting unit 15 extracts the user having an issued text containing the same keyword as the keyword of the information collected this time by examining the issued texts of the respective users stored in the user profile storage unit 14. The extracting unit 15 extracts, for example, the users having the keywords larger than a predetermined rate in the number of keywords of the information collected this time by retrieving the issued text of each user with each keyword of the information collected this time and thus checking whether or not the same keyword exists.

The similar information user common attribute extracting unit 15, if capable of extracting the plurality of users having a great number of keywords coincident with the keyword of the information collected this time, proceeds to step S8, in which the extracting unit 15 fetches the user attributes of each of the plurality of users from the user attribute information storage unit 13., then extracts the user attributes (the common user attributes) having the same value amongst the plurality of users, and notifies the information distributing unit 16 of these user attributes together with the information ID of the information collected this time. Note that if no single user attribute exists, the information distributing unit 16 is notified of this effect, whereas if incapable of extracting the plurality of such users, the processing for the information concerned is finished in this embodiment (S13). Namely, the information concerned is unable to be distributed to any users. Such information can be considered rare information, and therefore a construction of distributing the information to all the users may be contrived by way of another embodiment.

The information distributing unit 16 notified of the common user attributes from the similar information user common attribute extracting unit 15, determines the distributing target users in a way which follows (S9).

To start with, all the users having the same values as the notified common user attributes are obtained referring to the user attribute information storage unit 13, and the users thereof are set as temporary distributing target users.

Next, a distribution reason containing the common user attribute is generated.

Subsequently, whether or not the distribution reason of this time meets with the distribution necessary condition relative to the relevant user that is stored in the distribution necessary condition storage unit 18, is checked per user not included in the temporary distributing target users, and, if the distribution reason meets therewith, this user is included in the temporary distributing target users.

Next, whether or not the distribution reason of this time meets with the distribution unnecessary condition relative to the relevant user that is stored in the distribution unnecessary condition storage unit 19, is checked per temporary distributing target user, and, if the distribution reason meets therewith, this user is excluded from the temporary distributing target users.

The thus left temporary distributing target users are set as actual distributing target users, and the text of the information collected this time and the like is fetched out of the information activity management unit 12 on the basis of the information ID, and then distributed to each distributing target user with the above distribution reason as well as with the information ID (S10). The information is distributed to the users by a method of distributing the information directly to the users such as a method of transmitting it to the users through an e-mail and FAX etc and a method for the user to write in a pre-designated location and so forth. In addition, there can be adopted a method of locating the information in a place in which all the users are able to refer to in common and thus notifying the user of where the information exists. Note that the information distributing unit 16 registers the distributing target user as a "receiver" of the information distributed this time in the information activity management unit 12. Further, the information distributing unit 16 notifies the activity state registering unit 17 of the distribution reason as well as of the information ID of the information distributed this time, and the activity state registering unit 17 records these items inside.

While on the other hand, when notified of such an effect that no single common user attribute exists, the information distributing unit 16 does not distribute the information at all. The information distributing unit 16, if the similar information users have already been obtained, distributes the information to only those users, and, if the user having the issued text of the same keyword has been sought, the information distributing unit 16, distributes the information to only that user, thus performing the arbitrary operations.

The user to whom the information has been distributed is capable of transmitting to the information distributing system 1 an activity state of whether the information concerned is useful or useless through the e-mail etc. The notification of the activity state involves an addition of the information ID received when distributed in order to specify the information.

The activity state given from the user is analyzed by the activity state registering unit 17 in the information distributing system 1, and registration is implemented corresponding to the activity state (S11). That is, when notified from the user of the purport that the information could be effectively utilized, the activity state registering unit 17 registers a name of the user having made the notification in the item of "user" of the information within the information activity management unit 12 specified by the notified information ID. At this time, when notified of the using purpose together, the item of "using purpose" is also recorded. While on the other hand, when notified from the user of the effect that the information is not required, the activity state registering unit 17 registers the distribution unnecessary condition storage unit 19 with the distribution unnecessary condition based on the distribution reason recorded inside corresponding to the notified information ID, as one of the distribution unnecessary conditions of the user having made the notification.

Further, each user is capable of transmitting the condition under which to require the distribution through the e-mail at an arbitrary point of time. If notified of such a distribution necessary condition from the user, the activity state registering unit 17 registers the distribution necessary condition storage unit 18 with this distribution necessary condition as one of the distribution necessary conditions of the user having made the notification.

Next, the operation in this embodiment will be re-explained by giving a specific example.

Figure 5:
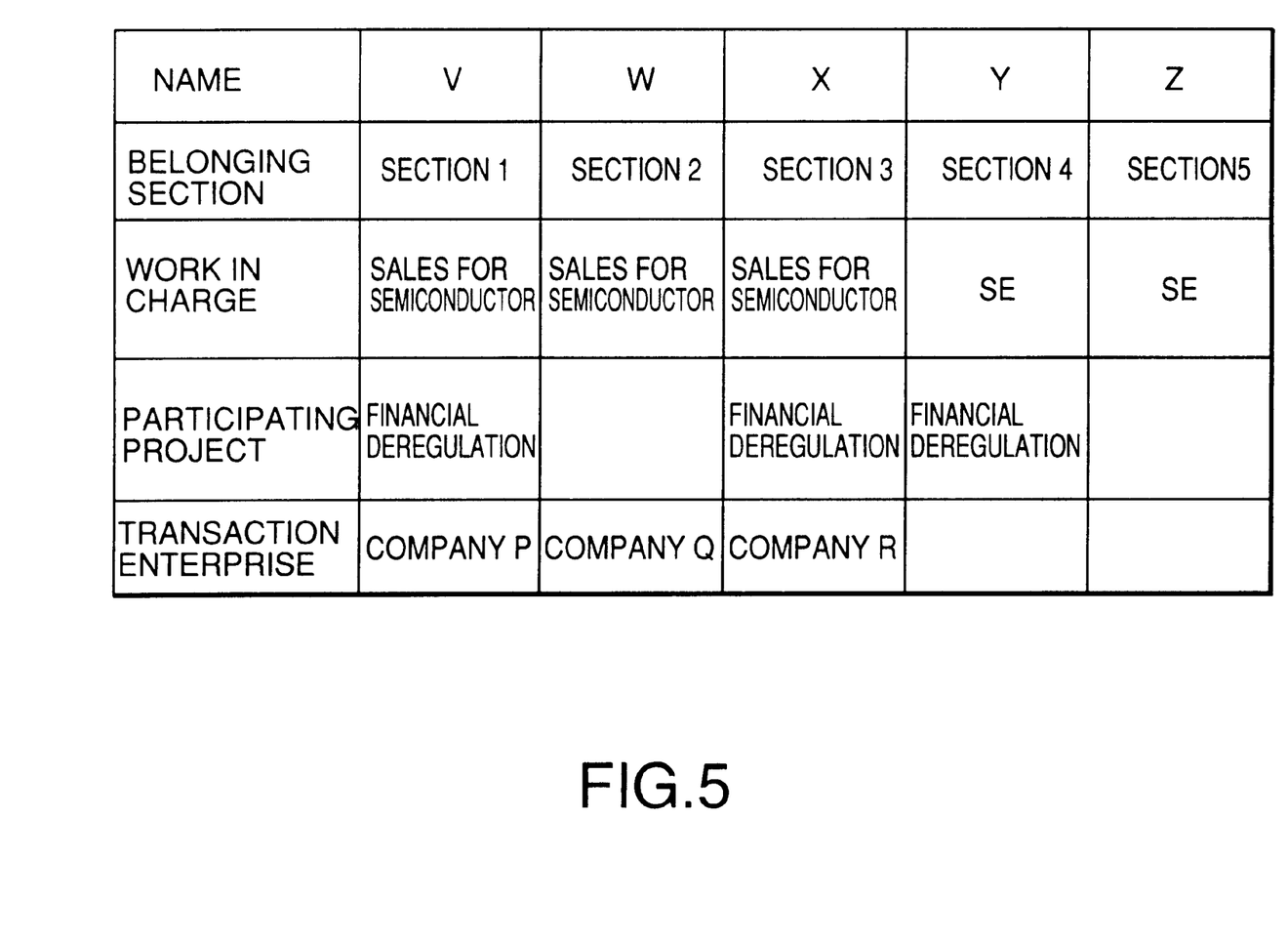
FIG. 5 is a chart showing an example of a recording content in a user attribute information storage unit.

Now, as shown in FIG. 5, it is assumed that the user attribute information storage unit 13 is registered with five users identified by V, W, X, Y and Z, and that the user attributes consist of a name, a belonging section, a work in charge, a participation project and a transaction enterprise. Note that a blanked user attribute implies a not-yet-set state. Further, the information activity management unit 12, it is assumed, be registered with two items of news 1 and 2 shown in FIG. 2.

At this time, a presumption is that the information collecting unit 11 takes, out of the product column on the electricity newspaper, news 3 with a content that "H company develops an STN system LCD capable of displaying a motion picture at a 5.5-fold response speed".

Figure 6:
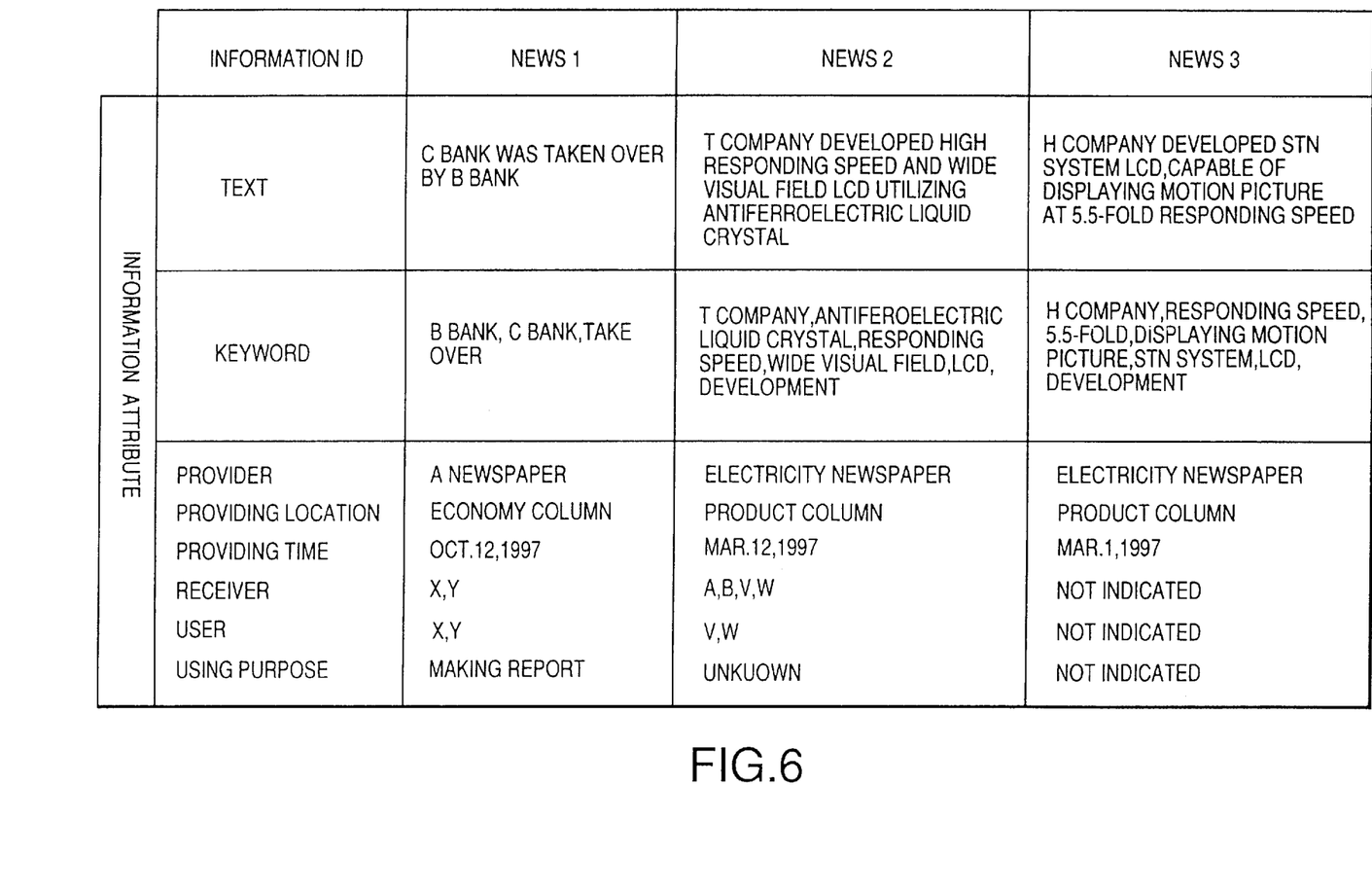
FIG. 6 is a chart showing an example of a content in an information activity management unit.

To begin with, the information collecting unit 11 extracts the "H company", the "response speed", "5.5-fold", "displaying the motion picture", the "STN system", "LCD" and "develops" as keywords, and recognizes that the provider is the electricity newspaper, and that the providing location is the product column as well as recognizing the providing time. Then, the information activity state management unit 12 is registered with these items. FIG. 6 shows an example of the content in the information activity management unit 12 at the point of time when the news 3 is newly registered.

Next, the similar information user common attribute extracting unit 15 extracts the news 2 as information exhibiting the characteristics most similar to the characteristics of the news 3, wherein the keywords such as the "response speed", "LCD" and "develops" are coincident, and the provider and the providing location are identical with the "electricity newspaper" and the "product column". Then, the similar information user common attribute extracting unit 15 extracts the users V, W of the news 2 and, the users being plural, extracts the common user attributes of the users V, W from the user attribute information storage unit 13 shown in FIG. 5. In this case, the "work in charge: sales for semiconductor" is picked up.

Next, the information distributing unit 16 extracts from the user attribute information storage unit 13 in FIG. 5 the user having the same user attribute as the "work in charge: sales for semiconductor" defined as the common user attribute. In this case, the users V, W, X are picked up and become the temporary distributing target users. Next, the information distributing unit 16 generates a distribution reason containing the common user attribute such as, e.g., "the news 2 similar to the news 3 has ever been utilized by the users V, W whose work in charge is the sales for semiconductor".

Next, the information distributing unit 16 checks whether or not the distribution reason of this time meets with the distribution necessary condition relative to the users that is stored in the distribution necessary condition storage unit 18 for each of the users Y, Z not included in the temporary distributing target users, and, if the above reason meets therewith, includes the user concerned in a category of the temporary distributing target users. Now, it is assumed that the "work in charge: sales for semiconductor" defined as the common user attribute in the distribution reason of this time is set as a distribution necessary condition by way of one of the distribution necessary conditions of the user Z, or that "the information similar to the information utilized by the users V, W" is set as a distribution necessary condition, in which case the user Z not having the same user attribute as the "work in charge: sales for semiconductor" defined as the common user attribute, is also included in the category of the distributing target users.

Next, the information distributing unit 16 checks whether or not the distribution reason of this time meets with the distribution unnecessary condition relative to the users that is stored in the distribution unnecessary condition storage unit 19 for each of the temporary distributing target users V, W, X, Z, and, if the above reason meets therewith, excludes the user concerned from the category of the temporary distributing target users. Accordingly, if the "work in charge: sales for semiconductor" defined as the common user attribute in the distribution reason of this time is set as a distribution unnecessary condition by way of one of the distribution unnecessary conditions of any one of the users, or if "the information similar to the information utilized by the users V, W" is set as a distribution unnecessary condition, in which case even the user having the same user attribute as the "work in charge: sales for semiconductor" defined as the common user attribute, is excluded from the category of the distributing target users. It is assumed at present that there is no user to be excluded, the final distributing target users are the users V, W, X and Z.

Thus, when the distributing target users are determined, the news is distributed to those users. At this time, these users are simultaneously informed of the distribution reason such as "because of the news 2 similar to the news 3 having been utilized by the users V, W whose work in charge is the sales for semiconductor". The users V, W, X, Z recognize that the news 3 is distributed to the users whose work in charge is the sales for semiconductor, and consequently a labor for classification when stored with the information can be reduced.

Thereafter, the activity state registering unit 17, when notified from any one of the distributing target users V, W, X, Z of a purport of the information having been effectively utilized, adds the name of the user to the item of "user" of the news 3 in the information activity management unit 12. Further, the activity state registering unit 17, when notified of the effect that the news 3 is unnecessary, registers the distribution unnecessary condition based on the distribution reason of this time, corresponding to the relevant user in the distribution unnecessary condition storage unit 19. If notified from, e.g., the user X of the effect that the news 3 is unnecessary, the activity state registering unit 17 registers the "work in charge: sales for semiconductor" and "the information similar to the information utilized by the users V, W" which are defined as the common user attributes in the distribution reason of this time, as the distribution unnecessary conditions of the user X. Accordingly, thereafter, if the information on the "work in charge: sales for semiconductor" and "the information similar to the information utilized by the users V, W" which are defined as the common user attributes, become the objects to be distributed, the distribution to the user X must be restrained.

The present invention, though the embodiments of the present invention have been discussed so far, is not limited to the embodiment discussed above but may include a variety of additions and modifications. For instance, the present invention may be constructed as follows.

(1) The information distributing unit 16, as far as the common user attribute obtained by the similar information user common attribute extracting unit 15 satisfies the predetermined distribution condition, determines the distributing target user corresponding to this common user attribute. For example, the number of common user attributes is compared with a predetermined threshold value (e.g., "2"), and, only when extracting the common user attributes the number of which exceeds the threshold value, the information is distributed by executing the processes from step S9 onwards on the assumption that the distribution condition is satisfied. Further, each user attribute is weighted, and, only when an added value of each weight of the common user attribute exceeds a certain threshold value, the information may be distributed by executing the processes from step S9 onwards on the assumption that the distribution condition is satisfied. For instance, three items of the transaction enterprise, the district in charge and the participation project are obtained as the common user attributes, and a sum of weights, if each weight thereof is assumed to be "1.0", becomes "3.0". Hence, if the threshold value is less than "3.0", it is assumed that the distribution condition is met, whereas if over "3.0", it is assumed that the distribution condition is not met. Furthermore, a variety of conditions such as a case of "a specified user attribute being shared" and so on can be set as a distribution condition. Incidentally, there may be adopted such arbitrary methods that if the distribution condition is not satisfied, no information is distributed; if the user of the similar information has already been obtained, the information is distributed to only this user; and if the user having the issued text of the same keyword has already been obtained, the information is distributed to only this user.

(2) The information distributing unit 16 distributes the information in such a way as to re-express or summarize the contents of the collected information on the basis of the user attributes stored in the user attribute information storage unit 13. For example, when distributing news such as "Patent cooperation between P company, Q company and R company", the information distributing unit 16 recognizes that the P, Q and R companies are the transaction enterprises of the users V, W, X from the contents in the user attribute information storage unit 13 shown in FIG. 5, and is capable of distributing the information while being re-expressed such as "Patent cooperation between the transaction enterprises of the users V, W, X". Further, the information distributing unit 16 recognizes that the P, Q and R companies are the transaction enterprises of the users, which deal with the sales for the semiconductor from the contents in the user attribute information storage unit 13 shown in FIG. 5, and is capable of distributing the information while being summarized such as "patent cooperation between the transaction enterprises dealing with the sales for the semiconductor".

(3) If there are not the plurality of users of the information most similar to the information taken in this time, the processing proceeds directly to step S12 (FIG. 4) If there exists other information under the second order having a higher degree of similarity than the fiducial value, however, whether or not there are the plurality of users thereof is checked, and, if the plurality of users exist, the user attribute common thereto is extracted in step S8. Then, the subsequent processes are to be executed.

As discussed above, the present invention exhibits effects as follows.

The information collected this time is distributed to the users who have ever utilized in the past the information similar to the information collected this time and to other users having the user attributes common to such users, and hence there must be decreased such a possibility that the information with which the users have great concern is not distributed. The reason why so is that the information of this time is considered useful to the users having ever utilized in the past the information similar to the information collected this time, and, on the other hand, even the users who have never utilized in the past the information similar to the information collected this time might consider the information of this time to be useful as the former users in the case of having the user attributes common to the users of the similar information.

Moreover, in the construction for the information distribution with an addition of the distribution reason containing the common user attribute to the collected information, the user is able to recognize which field the information distributed corresponds to, and the labor for rearranging the information distributed can be reduced.

In the construction including the distribution unnecessary condition storage unit for storing the distribution unnecessary condition per user, the information distributing unit, if the distribution reason of this time meets with the distribution unnecessary condition relative to the user which is stored in the distribution unnecessary condition storage unit, excludes even the user exhibiting the common user attribute obtained by the similar information user common attribute extracting unit out of the category of the distributing target users. Therefore, the user, if the information distributed for a certain distribution reason is unnecessary for the user himself or herself, notifies of this effect, whereby subsequent futile distributions based on the same distribution reason can be avoided.

In the construction including the distribution necessary condition storage unit for storing the distribution necessary condition per user, if the distribution reason of this time meets with the distribution necessary condition relative to the user which is stored in the distribution necessary condition storage unit, even the user having no common user attribute obtained by the similar information user common attribute extracting unit, can be included into the category of the distributing target users, thereby making much more elaborate distribution control possible.

What is claimed is:

1. An information distributing system comprising:

information collecting means for fetching information out of a database system;

information activity management means for recording some predetermined information attributes containing an item characterizing the information and an item identifying a user or users of the information for each information fetched;

user attribute information storage means for recording for each user some user attributes characterizing the user;

similar information user common attribute extracting means for retrieving from said information activity management means recorded information having characteristics similar to characteristics of the information fetched by said information collecting means, and, when a plurality of users are recorded in said information activity management means as the users of the recorded information, obtaining a user attribute common to all the users with reference to said user attribute information storage means;

information distributing means for obtaining all users having the common user attribute obtained by said similar information user common attribute extracting means with reference to said user attribute information storage means, and distributing the fetched information to these users; and activity state registering means for registering, when notified, from the users to whom the information is distributed, that the information is useful, these users in the item identifying the user or users of the distributed information in said information activity management means.

2. An information distributing system according to claim 1, wherein an item characterizing the information in said information activity management means includes an item of keyword contained in the information, an item of provider of the information and an item of providing location of the information, and said similar information user common attribute extracting means specifies most similar information by examining a degree of similarity in terms of the keyword contained in the information fetched by said information collecting means, the provider of the information, the providing location of the information, the item of keyword per information recorded in said information activity management means, the item of provider of the information and the item of the providing location of the information.

3. An information distributing system according to claim 2, further comprising:
   user profile storage means for storing a text issued in the past by each user,
   wherein said similar information user common attribute extracting means is constructed to extract, if there exists no characteristics in the recorded information that are similar to the characteristics of the information fetched by said information collecting means, and if, even when such information might exist, there are not a plurality of users thereof, the user issuing the text including the keyword contained in the information fetched by said information collecting means, by examining the issued texts of the respective users stored in said user profile storage means, and obtain, if there are the plurality of such users, the user attribute common to all the users with reference to said user attribute information storage means and notify said information distributing means of the common user attribute.

4. An information distributing system according to claim 3, wherein said information distributing means is constructed to distribute to the users the fetched information while adding a distribution reason containing the common user attribute obtained by said similar information user common attribute extracting means to the fetched information.

5. An information distributing system according to claim 4, further comprising:
   distribution unnecessary condition storage means for storing a distribution unnecessary condition for each user,
   wherein said activity state registering means is constructed to register, when notified from the user to whom the information is distributed of an effect that the information is unnecessary, the distribution unnecessary condition in said distribution unnecessary condition storage means based on the distribution reason of this time as a distribution unnecessary condition relative to this user, and
   said information distribution means is constructed to exclude, from distributing target users, even the user having the common user attribute obtained by said similar information user common attribute extracting means if the distribution reason of this time meets with the distribution unnecessary condition relative to the relevant user stored in said distribution unnecessary condition storage means.

6. An information distributing system according to claim 4, further comprising:
   distribution necessary condition storage means for storing a distribution necessary condition for each user,
   wherein said information distribution means is constructed to include, into distributing target users, even the user having the common user attribute obtained by said similar information user common attribute extracting means if the distribution reason of this time meets with the distribution necessary condition relative to the relevant user stored in said distribution necessary condition storage means.

7. An information distributing system according to claim 3, wherein said information distributing means is constructed to determine a distributing target user corresponding to the common user attribute obtained by said similar information user common attribute extracting means, so long as this common user attribute meets with a predetermined distribution condition.

8. An information distributing system according to claim 3, wherein said information distributing means is constructed to distribute the information in such a way as to re-express and summarize a content of the fetched information, depending on the user attribute stored in said user attribute information storing means.

9. A computer-readable medium recorded with a program for enabling a computer to function as:
   information collecting means for fetching information out of a database system;
   information activity management means for recording some predetermined information attributes containing an item characterizing the information and an item identifying a user or users of the information for each information fetched;
   user attribute information storage means for recording for each user some user attributes characterizing the user;
   similar information user common attribute extracting means for retrieving from said information activity management means recorded information having characteristics similar to characteristics of the information fetched by said information collecting means, and, when a plurality of users are recorded in said information activity management means as the users of the recorded information, obtaining a user attribute common to all the users with reference to said user attribute information storage means;
   information distributing means for obtaining all users having the common user attribute obtained by said similar information user common attribute extracting means with reference to said user attribute information storage means, and distributing the fetched information to these users; and
   activity state registering means for registering, when notified, from the users to whom the information is distributed, that the information is useful, these users in the item identifying the user or users of the distributed information in said information activity management means.

10. A computer program embodied in an electrical signal for enabling a computer to function as:
   information collecting means for fetching information out of a database system;
   information activity management means for recording some predetermined information attributes containing an item characterizing the information and an item identifying a user or users of the information for each information fetched;
   user attribute information storage means for recording for each user some user attributes characterizing the user;
   similar information user common attribute extracting means for retrieving from said information activity management means recorded information having characteristics similar to characteristics of the information fetched by said information collecting means, and, when a plurality of users are recorded in said information activity management means as the users of the recorded information, obtaining a user attribute common to all the users with reference to said user attribute information storage means;

information distributing means for obtaining all users having the common user attribute obtained by said similar information user common attribute extracting means with reference to said user attribute information storage means, and distributing the fetched information to these users; and activity state registering means for registering, when notified, from the users to whom the information is distributed, that the information is useful, these users in the item identifying the user or users of the distributed information in said information activity management means.

11. A method of distributing information comprising the steps of:

fetching information out of a database system;

recording some predetermined information attributes containing an item characterizing the information and an item identifying users of the information for each information fetched;

recording for each user some user attributes characterizing the user;

retrieving recorded information having characteristics similar to characteristics of the fetched information, and obtaining one or more user attributes that are common to all the users of the retrieved information; and determining users having the one or more common user attributes, and distributing the fetched information to these users.

* * * * *